(12) United States Patent
Jain et al.

(10) Patent No.: US 10,242,014 B2
(45) Date of Patent: Mar. 26, 2019

(54) FILESYSTEM WITH ISOLATED INDEPENDENT FILESETS

(71) Applicant: International Business Machines Corporation, Armonk, NY (US)

(72) Inventors: Reshu Jain, Sunnyvale, CA (US); Prasenjit Sarkar, San Jose, CA (US); Mohit Saxena, San Jose, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 14/613,413

(22) Filed: Feb. 4, 2015

(65) Prior Publication Data

US 2016/0224580 A1 Aug. 4, 2016

(51) Int. Cl.
*G06F 17/30* (2006.01)
*G06F 3/06* (2006.01)

(52) U.S. Cl.
CPC ...... *G06F 17/30094* (2013.01); *G06F 3/0631* (2013.01); *G06F 17/30194* (2013.01); *G06F 2205/064* (2013.01)

(58) Field of Classification Search
CPC .................. G06F 17/30094; G06F 17/30194
USPC .......................................................... 707/741
See application file for complete search history.

(56) References Cited

U.S. PATENT DOCUMENTS

| | | | |
|---|---|---|---|
| 5,828,876 A | 10/1998 | Fish et al. | |
| 7,386,559 B1 | 6/2008 | Desai et al. | |
| 7,945,726 B2 | 5/2011 | Faibish et al. | |
| 8,396,832 B2 | 3/2013 | Adkins et al. | |
| 8,495,108 B2 | 7/2013 | Nagpal et al. | |
| 8,566,371 B1* | 10/2013 | Bono | G06F 17/30079 707/822 |
| 9,250,823 B1* | 2/2016 | Kamat | G06F 3/0647 |
| 2012/0151245 A1 | 6/2012 | Chang et al. | |
| 2012/0272238 A1* | 10/2012 | Baron | G06F 17/30238 718/1 |

(Continued)

OTHER PUBLICATIONS

Hoblitt, J., "How to create GPFS 3.5 filesets with independant inode spaces," https://joshua.hoblitt.com/rtfm/2013/05/how_to_create_gpfs_3_5_filese . . . (modified May 28, 2013; accessed Sep. 25, 2014 3:22 PM).

(Continued)

*Primary Examiner* — Shahid A Alam
*Assistant Examiner* — Alicia M Antoine
(74) *Attorney, Agent, or Firm* — Stosch Sabo

(57) ABSTRACT

A filesystem includes a pool of data blocks and a pool of index blocks. Non-overlapping subpools of data blocks, including a first subpool of data blocks and a second subpool of data blocks, are identified within the pool of data blocks. Likewise, non-overlapping subpools of index blocks, including a first subpool of index blocks and a second subpool of index blocks, are identified within the pool of index blocks. A first file group is mounted within a global namespace on a first mount point on the filesystem. A second file group is also mounted within the global namespace on a second mount point on the filesystem. The first subpool of data blocks and the first subpool of index blocks are allocated to the first mounted file group, and the second subpool of data blocks and the second subpool of index blocks are allocated to the second mounted file group.

19 Claims, 12 Drawing Sheets

(56) References Cited

U.S. PATENT DOCUMENTS

| | | | | |
|---|---|---|---|---|
| 2013/0013654 | A1* | 1/2013 | Lacapra | G06F 17/30206 |
| | | | | 707/822 |
| 2014/0279849 | A1* | 9/2014 | Zhang | G06F 17/30312 |
| | | | | 707/609 |
| 2014/0310473 | A1* | 10/2014 | Bilas | G06F 11/00 |
| | | | | 711/129 |
| 2017/0075779 | A1* | 3/2017 | Grimaldi | G06F 17/30168 |

OTHER PUBLICATIONS

IBM, "Filesets," http://www-01.ibm.com/support/knowledgecenter/SSFKCN_4.1.0/com.ibm.cluster.gpfs.v4rl.g . . . , (accessed Jan. 16, 2015 10:24 AM).

IBM, "Managing the number of files in a file system or file set," http://www-01.ibm.com/support/knowledgecenter/STAV45/com.ibm.sonas/doc/mng_t_filesys_ . . . (accessed Jan. 16, 2015 10:21 AM).

Wikipedia, "XFS," http://en.wikipedia.org/wiki/XFS#Allocation_groups (last modified Jan. 2, 2015 at 16:06; last accessed Jan. 16, 2015 10:12 AM).

* cited by examiner

100

```
┌─────────────────────────────────────────────────────────┐
│   RECEIVE A REQUEST TO CREATE A NEW FLIESET FOR A SET OF FILES   │
│                            101                          │
└─────────────────────────────────────────────────────────┘
                              │
                              ▼
┌─────────────────────────────────────────────────────────┐
│   MOUNT THE NEW FILESET ON THE FILESYSTEM AT A MOUNT POINT   │
│                 WITHIN A GLOBAL NAMESPACE               │
│                            102                          │
└─────────────────────────────────────────────────────────┘
                              │
                              ▼
┌─────────────────────────────────────────────────────────┐
│   ALLOCATE A SUBPOOL OF DATA BLOCKS AND A SUBPOOL OF INODES TO   │
│                      THE NEW FILESET                    │
│                            103                          │
└─────────────────────────────────────────────────────────┘
                              │
                              ▼
┌─────────────────────────────────────────────────────────┐
│   POPLULATE THE ALLOCATED INODES WITH FILE METADATA FROM THE   │
│  SET OF FLES AND THE ALLOCATED DATA BLOCKS WITH FILE DATA FROM  │
│                       THE SET OF FILES                  │
│                            104                          │
└─────────────────────────────────────────────────────────┘
```

FIG. 1

FILESYSTEM WITH ISOLATED INDEPENDENT FILESETS

BACKGROUND

The present disclosure relates to data processing, and more specifically, to a filesystem having isolated independent filesets.

In a computer system, there is often a large amount of data to be organized. Rather than storing all of the data together in one large undifferentiated grouping, the data may be divided into smaller groups of data called files. Each file may include a filename, file data (e.g., the particular group of data which forms that file), and file metadata. The file metadata may include relevant information about a particular file. This information may include, for example, the size of the file, the location of the file data, the date the file was last modified, the creation date of the file, the ownership of the file, etc. Files, in turn, may be organized into sets of (i.e., one or more) files called file groups. In some configurations, examples of file groups may include filesets. Sets of (i.e., one or more) filesets may then be grouped into a filesystem. In some configurations, a filesystem may refer to the logical and/or physical structure within which data is organized, as well as the rules that govern how that data is stored and retrieved. Further, in some configurations, a fileset may itself qualify as a filesystem.

SUMMARY

According to embodiments of the present disclosure, aspects of the disclosure may include a method, a system, and computer program product for managing a filesystem. The filesystem includes a pool of data blocks and a pool of index blocks. Non-overlapping subpools of data blocks, including a first subpool of data blocks and a second subpool of data blocks, are identified within the pool of data blocks. Non-overlapping subpools of index blocks, including a first subpool of index blocks and a second subpool of index blocks, are identified within the pool of index blocks. A first file group is mounted within a global namespace on a first mount point on the filesystem. A second file group is also mounted within the global namespace on a second mount point on the filesystem. The first subpool of data blocks and the first subpool of index blocks are allocated to the first mounted file group, and the second subpool of data blocks and the second subpool of index blocks are allocated to the second mounted file group.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

FIG. 1 illustrates a flowchart of an example method for managing a filesystem, in accordance with embodiments of the present disclosure.

Figure 2:
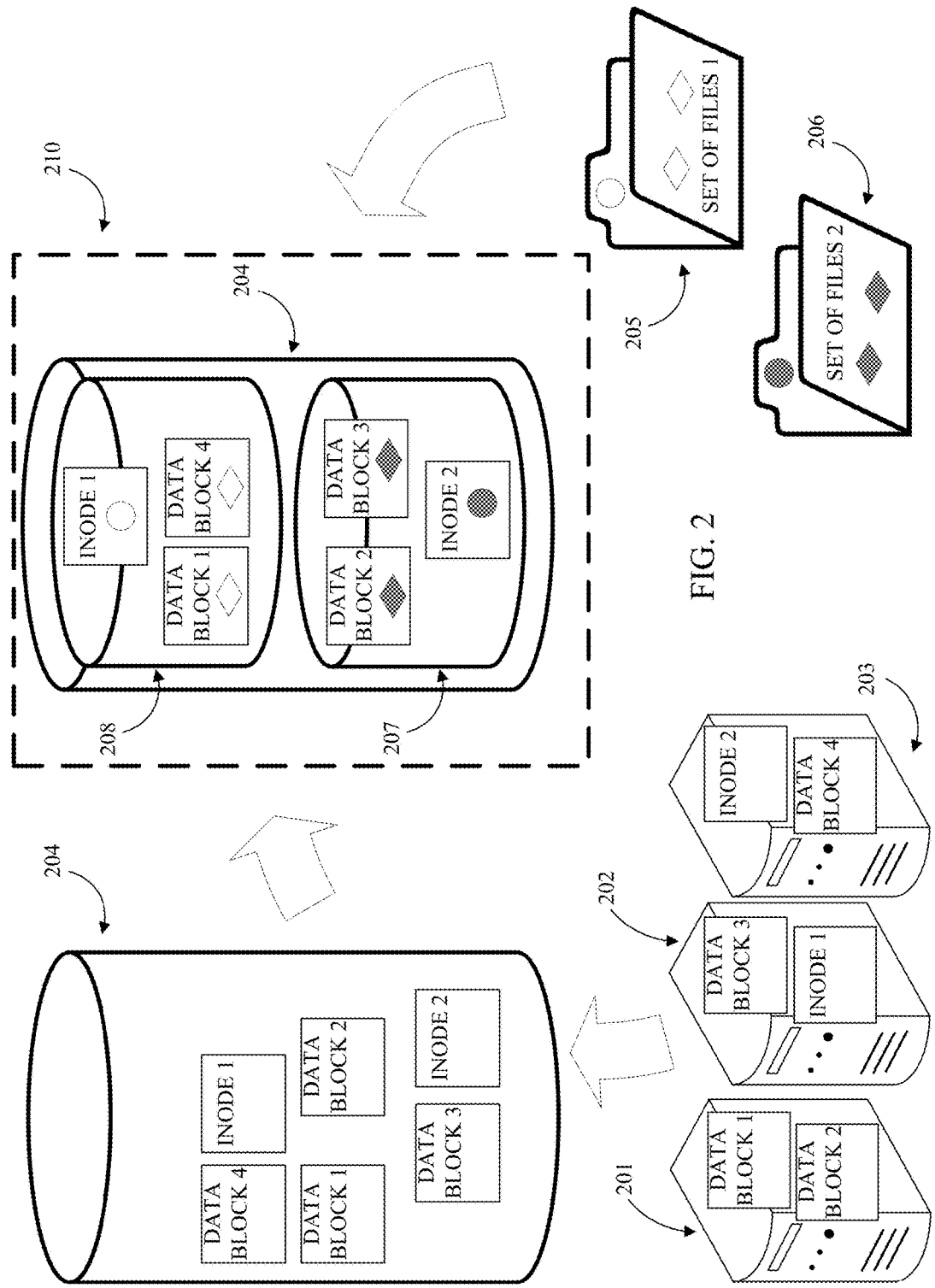
FIG. 2 illustrates a block diagram depicting the configuration of blocks and files within isolated independent filesets, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing, and more specifically, to a filesystem having isolated independent filesets. While the present disclosure is not necessarily limited to such applications, various aspects of the disclosure may be appreciated through a discussion of various examples using this context. Furthermore, while the terms fileset and inode are used throughout the specification, it is contemplated that, in some embodiments, these terms may refer to specific examples of the broad concepts of file groups and index blocks, respectively, and these broad concepts may likewise be applied to the various examples used throughout the specification.

For the purpose of physical storage of files on a computer system architecture, storage devices of the computer system (e.g., hard disks on servers), may have pools of storage capacity. These pools may be divided into blocks (e.g., logical or physical fixed-sized storage structures). Types of pools may include pools of data blocks and pools of inodes. As used herein, a data block may refer to a block for storing data (e.g., file data). Likewise, an index block may refer to a block for storing metadata (e.g., file metadata). In some configurations, examples of index blocks may include inodes. Thus, in use, storing a file within a computer system may involve both storing (e.g., populating, blocking) its file data on one or more data blocks and storing (e.g., populating, blocking) its file metadata on one or more inodes. Furthermore, in some configurations, part of the file metadata stored on an inode may include the location of a data block on which corresponding file data is stored. This may mean that the inode points to the data block.

In some configurations of distributed computing environments, any number of computer systems (e.g., servers) may be linked together (e.g., in a computer cluster) to form one or more combined networks. Within such a distributed environment, files may be organized into local filesystems and/or distributed filesystems. As used herein, a local filesystem may refer to a filesystem including (or configured to manage) only files that are physically located on a single computer system (e.g., all of the files on a single server or a single node). Furthermore, as used herein, a distributed filesystem (e.g., a cluster filesystem) may refer to a filesystem including (or configured to manage) files that are physically located on two or more computer systems (e.g., all of the files on a first server and a portion of the files on a second server).

In some configurations, a distributed filesystem may manage both its pool of data blocks and its pool of inodes at a single, filesystem-wide level. This may mean that when any given file or set of files (e.g., in a fileset) is stored within the distributed filesystem, the corresponding file data may be stored on any unused data block(s) within the entire pool of data blocks and the corresponding file metadata may be stored on any unused inode(s) within the entire pool of inodes. As such, prior to being used together to store a particular file, a particular data block and a particular inode may have no shared association other than being part of the same large filesystem.

This method of managing files may create certain problems. For example, in the case of a corruption in a portion of the distributed filesystem, the corruption may spread throughout the distributed filesystem and may be difficult to fix. More specifically, this method of managing files may be particularly susceptible to double allocation problems. For example, if a software or hardware bug marks a data block currently be used by one fileset as free, then another fileset may attempt to store data in that data block as well. This corruption may then spread throughout the distributed filesystem through multiple misallocations.

These issues of corruption isolation may be particularly troubling in the context of virtual machines. This may be because, in some configurations, the files that make up multiple virtual hard disks may be scattered throughout a host server, without any way to contain corruption that occurs in a file of one virtual machine before it spreads to the files of other virtual machines.

In addition, a distributed filesystem having a single, undivided pool of data blocks and a single, undivided pool of inodes may also have difficulty creating performance isolation between files or sets of files. In some configurations, performance isolation between files may be achieved by isolating these files on different local filesystems. This method of using local filesystems, however, may be difficult to manage.

In some embodiments of the present disclosure, a distributed filesystem may be able to create corruption isolation and/or performance isolation between sets of files by using isolated independent filesets. In some embodiments, all of the data blocks and inodes of a distributed filesystem may not be managed in monolithic pools, rather the management may be divided up into smaller units (e.g., isolated independent filesets) that utilize smaller, non-overlapping subpools. Specifically, these isolated independent filesets may have their own subpools of data blocks and their own subpools of inodes. Further, upon allocation to an isolated independent fileset, a subpool of data blocks may be used to store data from the isolated independent fileset's files. Likewise, upon allocation to an isolated independent fileset, a subpool of inodes may be used to store metadata from the isolated independent fileset's files. As used herein, in some embodiments, two or more subpools of data blocks may be deemed non-overlapping when they do not share data blocks with each other or with a larger undifferentiated pool of data blocks. Likewise, two or more subpools of inodes may be deemed non-overlapping when they do not share inodes with each other or with a larger undifferentiated pool of inodes.

Turning now to FIG. 1, shown is a flowchart of an example method 100 for managing a filesystem, in accordance with embodiments of the present disclosure. In some embodiments, the method 100 may be a method used by a filesystem for establishing new isolated independent filesets. The method 100 may begin at block 101 wherein a filesystem manager may receive a request to create a new fileset (for a set of files) in the filesystem. This may occur, for example, when an application requires the new fileset as a location for computing an intermediate function as part of a larger process to be performed by the application. This request may also occur, for example, when a new virtual hard disk is to be mapped onto the new fileset. Furthermore, in some embodiments, the impetus to create a new fileset may not be an external request per se, but rather may be based on the filesystem manager itself determining that a new fileset is necessary or appropriate.

Next, per block 102, the filesystem manager may mount the new fileset (e.g., an isolated independent fileset) on the filesystem at a mount point within a global namespace. As used herein, in some embodiments, mounting may refer to mapping a fileset to a location on a filesystem in order to make it accessible. Further, as used herein, a global namespace may refer to a logical layer between a filesystem and users of the filesystem (e.g., applications, human end-users) that allows the users to view and access files of the filesystem independent of the physical location of the files. In some embodiments, the files or sets of files that share a global namespace may be accessible by a client regardless of the physical location of that client.

Per block 103, the filesystem manager may allocate, from its pool of data blocks, a subpool of data blocks to the new fileset and allocate, from its pool of inodes, a subpool of inodes to the new fileset. In some embodiments, these allocations may result in (or, rather, in some embodiments, these allocation may be) changes in ownership and/or control of the subpools from the filesystem level (e.g., the filesystem manager) to the fileset level (e.g., a fileset manager). In some embodiments, the allocation of the subpool of data blocks to the new fileset may occur before, after, or simultaneously with the allocation of the subpool of inodes to the new fileset.

Per block 104, the fileset manager may store the set of files by populating the subpool of inodes with file metadata from the set of files and by populating the subpool of data blocks with file data from the set of files. In some embodiments, once the set of files is stored within the subpools of the fileset, those files may have a useful degree of isolation from the other sets of files stored within the filesystem.

In some embodiments, once an isolated independent fileset is created, it may be able to manage independently its subpools of data blocks and inodes. For example, the isolated independent fileset may be able to use specific data blocks and specific inodes from its subpools in order to store a file. Further, when the file is trashed, those specific data blocks and inodes may be reincorporated into their respective subpools until they are needed for new files.

Figure 10:
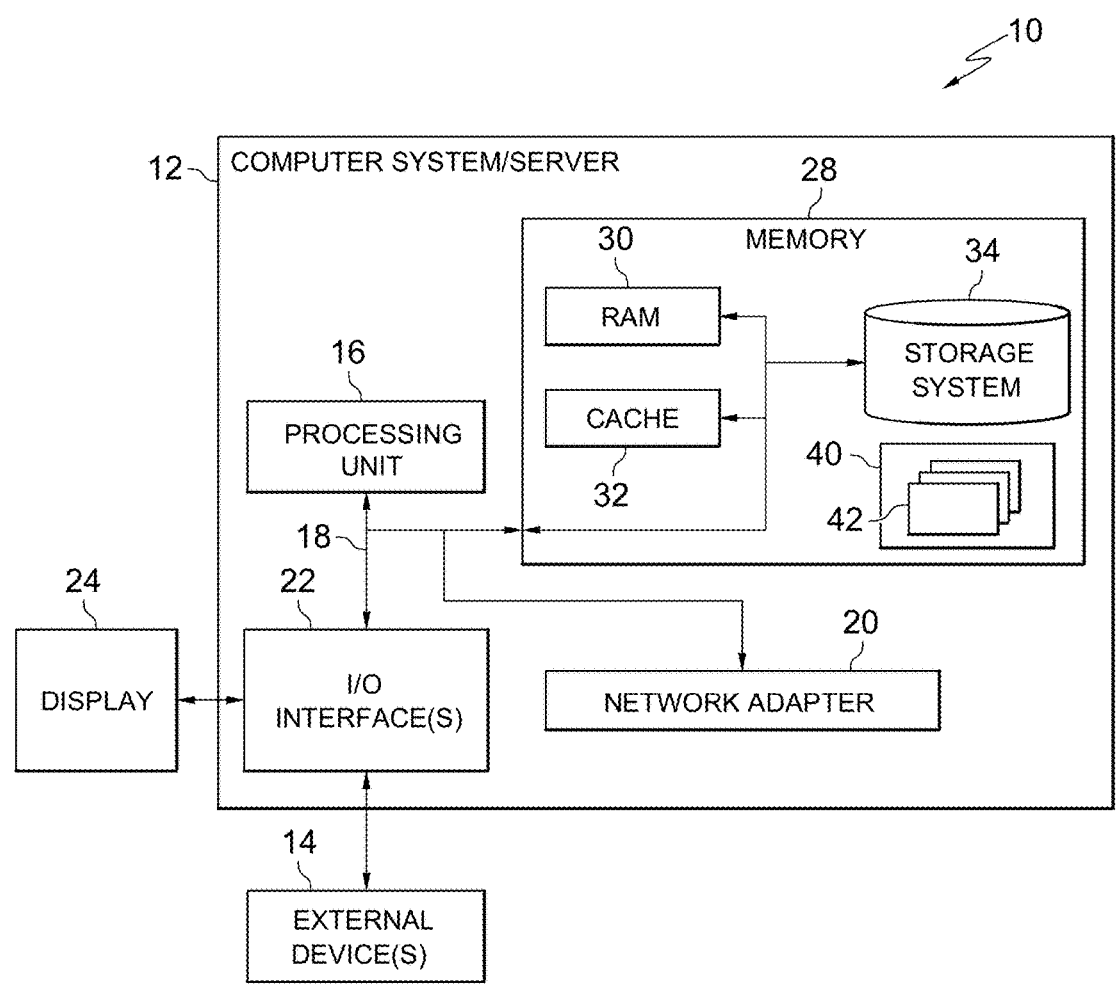
FIG. 10 illustrates a diagram of a cloud computing node, in accordance with embodiments of the present disclosure.

It is contemplated that example method 100 may be employed in the context of a distributed filesystem or, in some embodiments, a local filesystem. The latter may occur, for example, in a pseudo-distributed filesystem or other single server environments. Further, in some embodiments, the various modules described herein (e.g., a filesystem manager) can be part of a computer system that includes at least one computer processor circuit that is configured to carry out the various functions describe herein. Such computer processor circuits may be included, for example, in the computer system/server 12 as shown in FIG. 10.

In some embodiments, the method 100 may be repeated as necessary to generate any number of isolated independent filesets with the filesystem. Further, when any given isolated independent fileset is no longer needed it may be trashed. This may involve unmounting the isolated independent fileset, marking its subpools of inodes and data blocks as free, and reincorporating these subpools back into the filesystem's main pools. Those inodes and data blocks then may be reused in future allocations to new isolated independent filesets.

In some embodiments, each isolated independent fileset created in a filesystem may be configured to be maintained and repaired individually. This may be possible because each isolated independent fileset includes its own subpools of inodes and data blocks. For example, in some embodiments, if there is a fault or corruption in one isolated independent fileset, the corruption may be limited to that fileset's inodes and data blocks and the remainder of the filesystem (including other isolated independent filesets) may be unaffected. Furthermore, if a filesystem check (e.g., a fsck operation) is performed on one isolated independent fileset it may be independent of the remainder of the filesystem. For example, in some embodiments, a filesystem check could be performed in one isolated independent fileset without contemporaneously performing the filesystem check in another isolated independent fileset of the same filesystem. Similarly, in some embodiments, if recovery is invoked on one isolated independent fileset because of corruption, only that one isolated independent fileset could be taken down for the recovery and the rest of the filesystem could remain available for use. In some embodiments, this concept of managing corruption of isolated independent filesets individually could lead to faster recoveries (e.g., because only that one portion of the filesystem needs to be repaired).

Turning now to FIG. 2, shown is a block diagram depicting the configuration of blocks and files within isolated independent filesets 207 and 208, in accordance with embodiments of the present disclosure. As shown, four data blocks (data blocks 1-4) and two inodes (inodes 1-2) are physically located on three servers (servers 201-203). More specifically, data block 1 and data block 2 are located on server 201, data block 3 and inode 1 are located on server 202, and data block 4 and inode 2 are located on server 203. In some embodiments, to the extent that data blocks or inodes are logical structures, they may correspond (e.g., in a one to one relationship) to counterpart physical data blocks or inodes, respectively. In some embodiments, servers 201-203 may be shared nodes within a network of computer systems. Further, in some embodiments, servers 201-203 may each correspond to a cloud computing node 10 as shown in FIG. 10.

As depicted, these data blocks and inodes may all form part of a single filesystem 204. In some embodiments, filesystem 204 may be deemed a distributed filesystem including a pool of data blocks (data blocks 1-4) and a pool of inodes (inodes 1-2) spread out across servers 201-203.

Also shown are two sets of files (set of files 1 and set of files 2). As depicted, the set of files 1 includes a single file 205 and set of files 2 includes a single file 206. Within file 205 is file metadata (represented by an empty circle) and file data (represented by two empty diamonds). Likewise, file 206 includes file metadata (represented by a shaded circle) and file data (represented by two shaded diamonds).

As depicted, two isolated independent filesets 207 and 208 are created within filesystem 204. The isolated independent filesets 207 and 208 also share a global namespace 210 with each other and with filesystem 204. Each isolated independent fileset is allocated a non-overlapping subpool of data blocks (data blocks 2 and 3 for isolated independent fileset 207 and data blocks 1 and 4 for isolated independent fileset 208) and is further allocated a non-overlapping subpool of inodes (inode 2 for isolated independent fileset 207 and inode 1 for isolated independent fileset 208). In some embodiments, isolated independent filesets 207 and 208 may be separated by one or more partitions. Further, in some embodiments, a pool of data blocks may be a block map range and each subpool of data blocks may be a portion of the block map range. Likewise, in some embodiments, a pool of inodes may be an inode range and each subpool of inodes may be a portion of the inode range.

Also as depicted, files 205 and 206 are stored in isolated independent filesets 208 and 207, respectively. More specifically, file data from file 205 is stored in data blocks 1 and 4, file metadata from file 205 is stored in inode 1, file data from file 206 is stored in data blocks 2 and 3, and file metadata from file 206 is stored in inode 2.

While limited numbers of each of the elements of FIG. 2 (data blocks, inodes, files, filesets, etc.) are shown for the sake of simplicity, it is contemplated that, in some embodiments, any number of any of these elements may be included.

Figure 3:
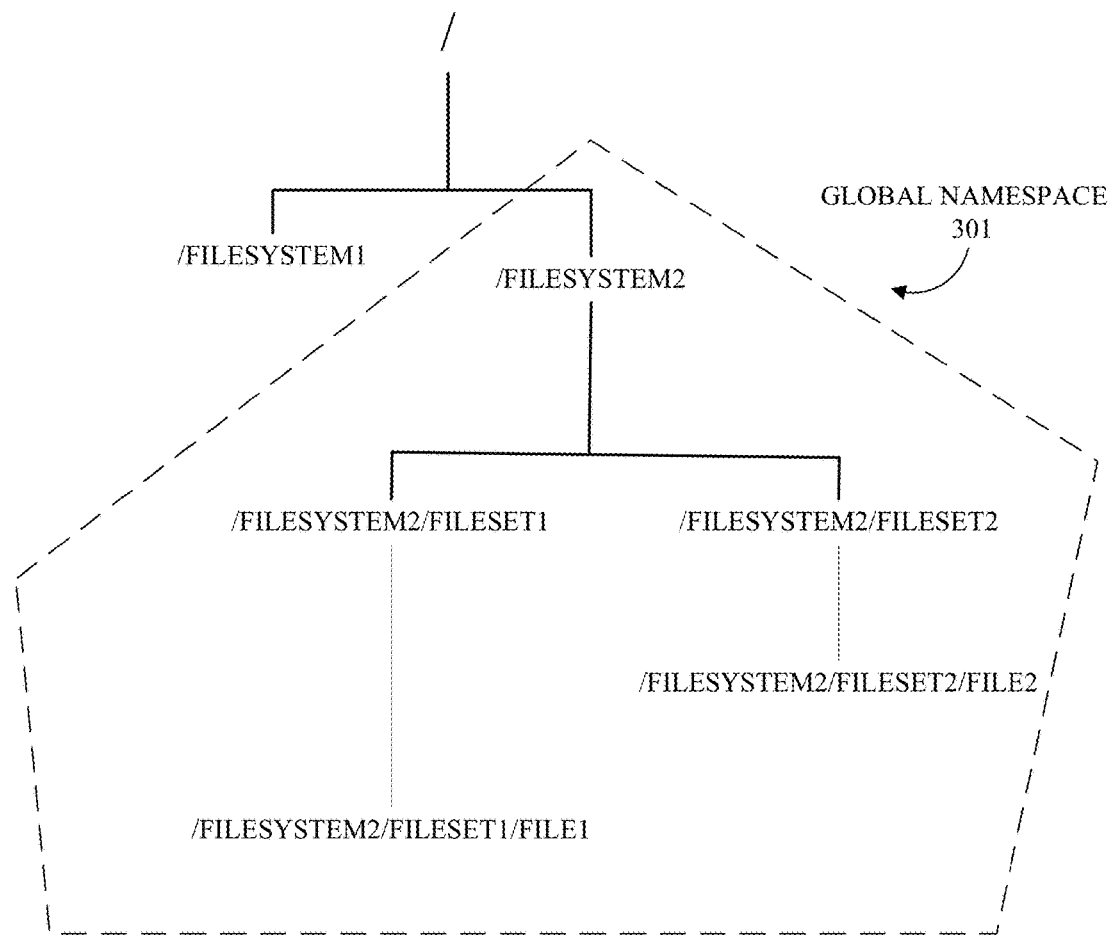
FIG. 3 illustrates a block diagram of an example directory tree including a global namespace, in accordance with embodiments of the present disclosure.

Turning now to FIG. 3, shown is a block diagram of an example directory tree 300 including a global namespace 301, according to embodiments of the present disclosure. As shown, directory tree 300 includes a root directory/with two filesystems mounted on mount points of the root directory / as /FILESYSTEM1 and /FILESYSTEM2. Further, as shown, mounted on separate mount points of filesystem 2 are two filesets, /FILESYSTEM2/FILESET1 and /FILESYSTEM2/FILESET2. In some embodiments, filesets 1 and 2 may both be considered child filesets mounted on nested mount points of filesystem 2 (the parent filesystem). Further, in some embodiments, filesets 1 and 2 may themselves be filesystems.

In some embodiments, as used herein, a fileset may be a sub-tree of a filesystem directory tree within a global namespace and may provide for file management on a lower, more manageable level. Such a fileset may act as an administrative barrier that serves to manage the organization of the files allocated (e.g., mounted) to it. As shown, mounted on a mount point of the fileset 1 is a file, /FILESYSTEM2/FILESET1/FILE1, and mounted on a mount point of fileset 2 is another file, /FILESYSTEM2/FILESET2/FILE2. In the depicted embodiment, a single global namespace 301 is shared by filesystem 2 and all of the objects in the directory 300 that are mounted (directly or indirectly) on filesystem 2. Furthermore, while as shown filesystem1 is not included in global namespace 301, it is contemplated that, in some embodiments, all of the filesystem objects that are mounted (directly or indirectly) on a root directory may share a single global namespace.

In some embodiments, fileset 1 and/or fileset 2 may be isolated independent filesets. Furthermore, in some embodiments, filesystem 2, fileset 1, fileset 2, file 1, and file 2 may correspond to filesystem 204, fileset 208, fileset 207, file 205, and file 206 of FIG. 2, respectively.

Figure 4:
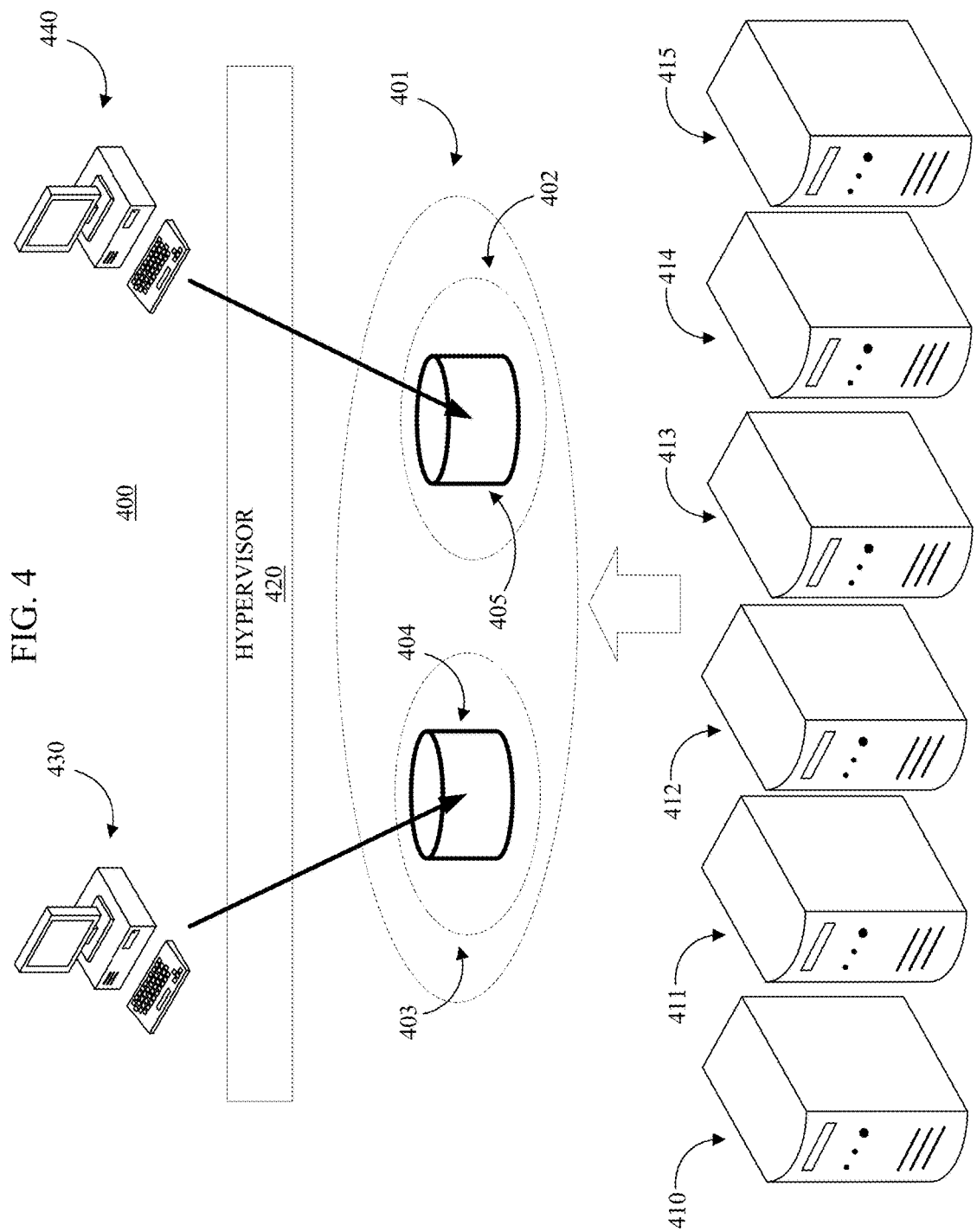
FIG. 4 illustrates a block diagram of an example virtual computing environment including isolated independent filesets for providing isolation between virtual machines, in accordance with embodiments of the present disclosure.

Turning now to FIG. 4, shown is a block diagram of an example virtual computing environment 400 including isolated independent filesets 404 and 405 for providing isolation between virtual machines, according to embodiments of the present disclosure. In some embodiments, virtual computing environment 400 may be a cloud computing environment as described herein. As shown, virtual computing environment 400 includes six server nodes 410-415 that are managed by distributed filesystem 401. Within distributed filesystem 401 are two filesets 402 and 403, which include the files for the virtual hard disks 405 and 404, respectively. The use of these virtual hard disks 405 and 404 by virtual machines on clients 430 and 440 may be managed by a hypervisor 420 disposed between the clients and the virtual hard disks.

In some embodiments, because filesets 402 and 403 are isolated independent filesets they may provide barriers between their respective virtual hard disk (405 or 404), and the remainder of the contents of filesystem 401. For example, if corruption were to occur in virtual hard disk 405, the fact that the files of the virtual machine 405 are isolated within isolated independent fileset 402 may prevent that corruption from spreading to other files of filesystem 401 outside of the fileset 402.

Figure 5:
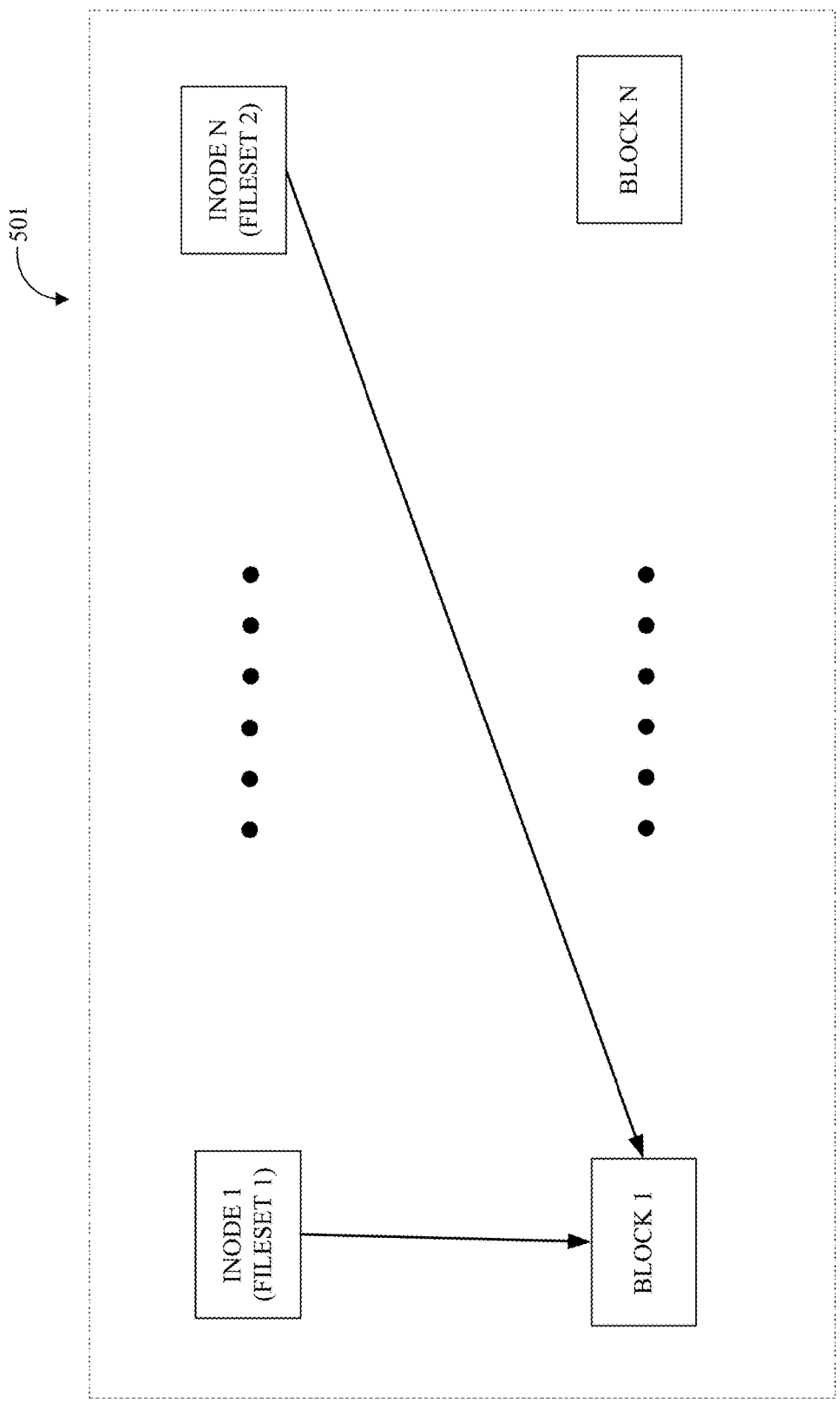
FIG. 5 illustrates a block diagram of an example double allocation error in a filesystem lacking isolated independent filesets, in accordance with embodiments of the present disclosure.

Turning now to FIG. 5, shown is a block diagram of an example double allocation error in a filesystem 501 lacking isolated independent filesets, according to embodiments of the present disclosure. As shown, filesystem 501 includes a pool of inodes incorporating inode 1 to inode N and further includes a pool of data blocks incorporating block 1 to block N. In some embodiments, N may represent any number of inodes or data blocks. In the depicted configuration, inode 1 is populated with metadata from files of a fileset 1 and inode N is populated with metadata from files of a fileset 2. Because filesets 1 and 2 are not isolated independent filesets, they do not include their own isolated subpools of data blocks. Instead, in this configuration, all of the filesets of filesystem 501 share the entire pool of data blocks from blocks 1 to N.

As a result of the lack of isolation within the filesets of the filesystem 501, the filesystem may be susceptible to double allocation problems across filesets. In the depicted instance, inode 1 properly points to block 1. This should mean that no other inodes will point to block 1; however, due to an error (e.g., a software bug), block 1 is marked as being free and inode N also begins pointing to block 1. This results in the double allocation problem because both inode 1 and inode N indicate ownership of block 1. Furthermore, because of this error, the corruption caused by the software bug is able to affect both filesets 1 and 2, rather than just fileset 1 where the corruption began. Furthermore, in some embodiments, if a filesystem check or other recovery procedure is needed in order to repair the error, then the entire filesystem 501 (including filesets 1 and 2) may need to be taken down for the procedure.

Figure 6:
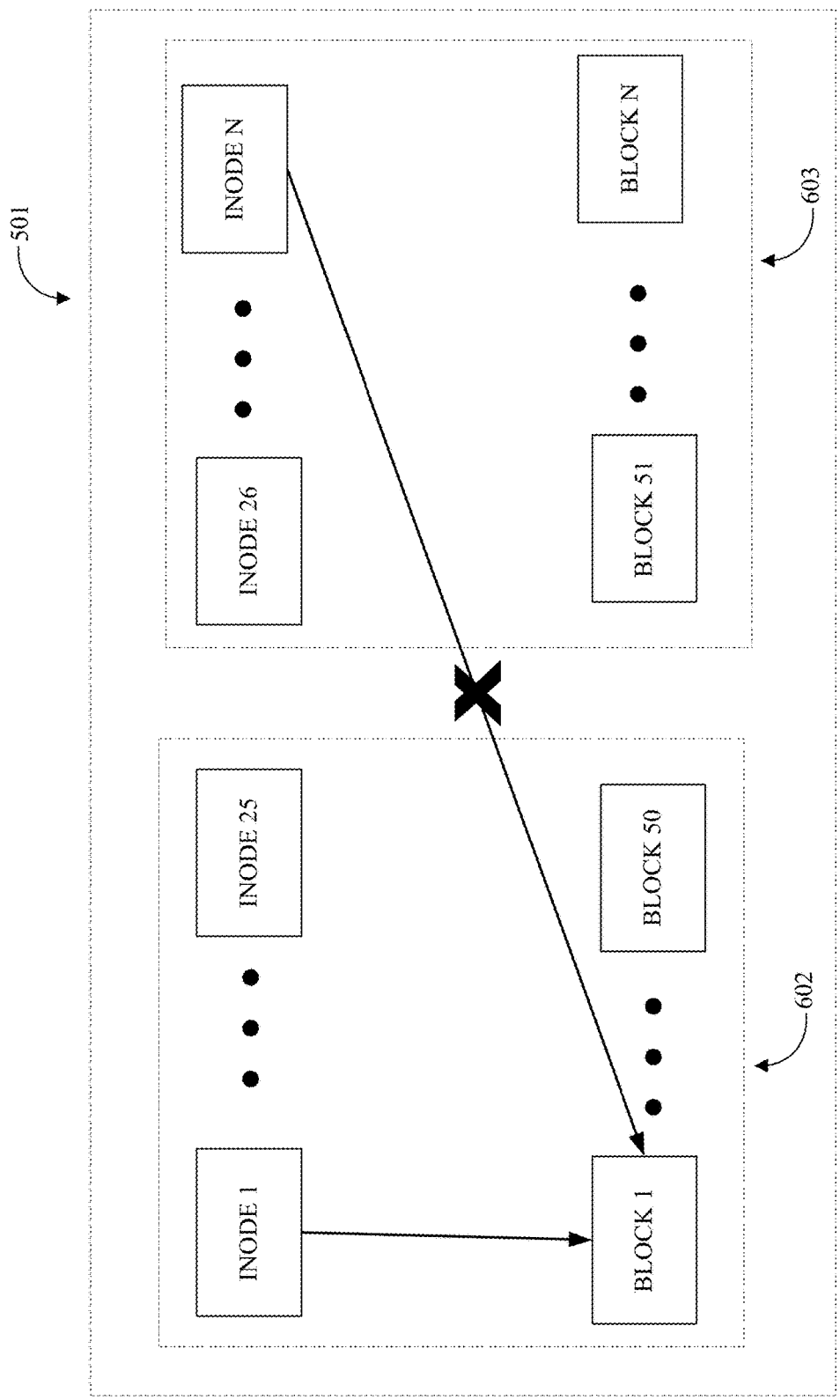
FIG. 6 illustrates a block diagram of the filesystem of FIG. 5, wherein isolated independent filesets are included, in accordance with embodiments of the present disclosure.

Turning now to FIG. 6, shown is the filesystem 501 of FIG. 5, wherein isolated independent filesets 602 and 603 are included, according to embodiments of the present disclosure. As shown, this version of filesystem 501 includes isolated independent filesets 602 and 603 (rather than the filesets 1 and 2 discussed in FIG. 5). Isolated independent fileset 602 has been allocated inodes 1 to 25 and blocks 1 to 50. Isolated independent fileset 603 has been allocated inodes 26 to N and blocks 51 to N. Like as shown in FIG. 5, inode 1 points to block 1 and an error (e.g., a software bug that affects fileset 602) causes block 1 to be marked as free. Unlike as shown in FIG. 5, however, the inode N is not able to point to block 1. Instead, because of the corruption isolation created by the isolated independent filesets 602 and 603, Inode N is not able to point to block 1 (because inode N and block 1 are allocated to different filesets). As a result, corruption caused by the software bug may not be able to spread between the filesets (e.g., it may not be able to spread beyond fileset 602). Furthermore, in some embodiments, a filesystem check or other recovery procedure may be performed on fileset 602 alone, without the need for fileset 603 or the remainder of filesystem 501 to be taken down.

Figure 7:
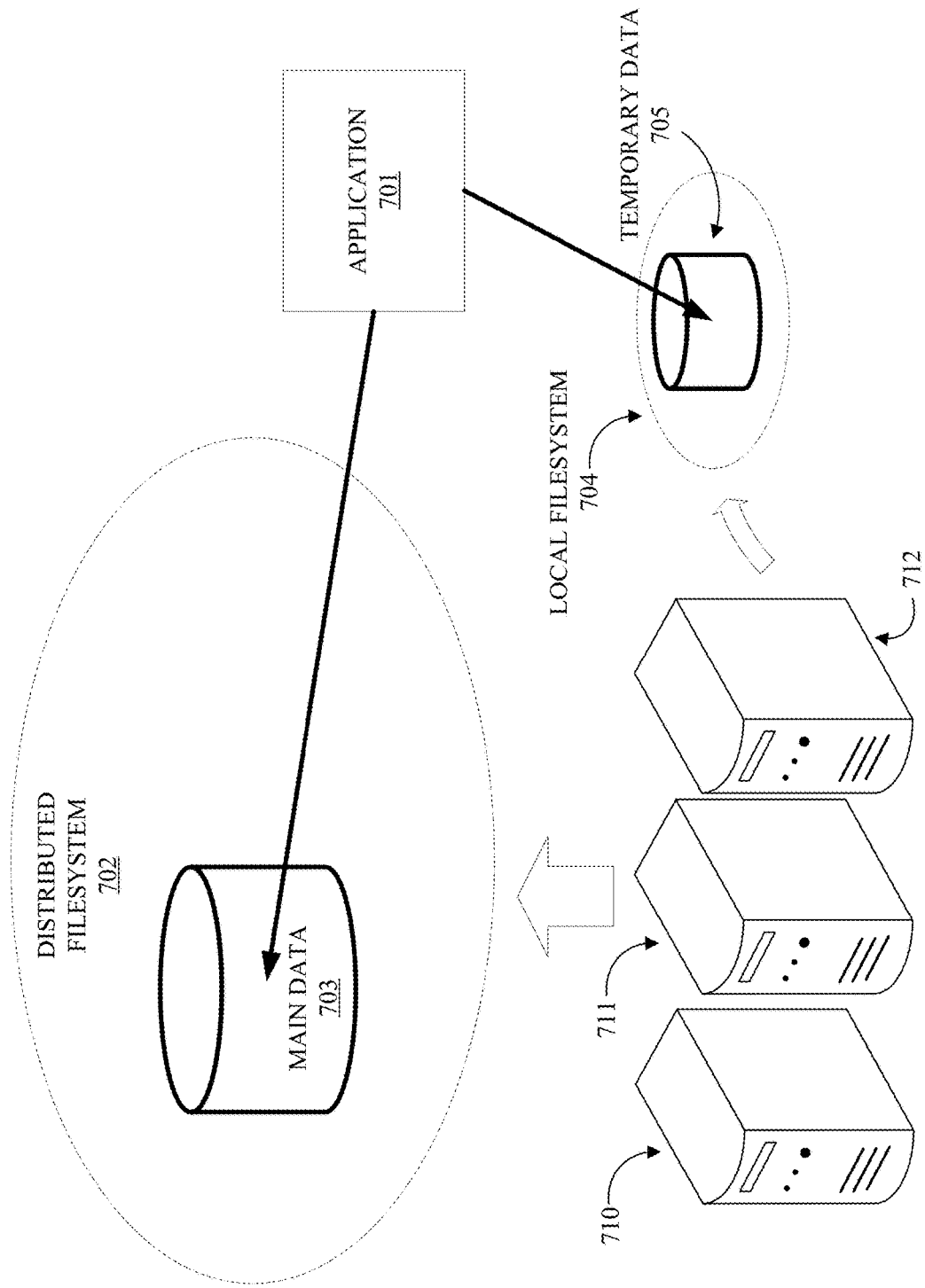
FIG. 7 illustrates a block diagram of an application using a local filesystem for storing temporary data, in accordance with embodiments of the present disclosure.

Turning now to FIG. 7, shown is a block diagram of an application 701 using a local filesystem 704 for storing temporary data 705, according to embodiments of the present disclosure. As shown, servers 710, 711, and 712 form a cluster that is managed by a distributed filesystem 702. Server 712 also includes a local filesystem 704. In the depicted configuration, application 701 stores its main data 703 on the distributed filesystem 702 and its temporary data 705 on the local filesystem 704. In some configurations, application 701 may be an analytics application that requires a temporary location (e.g., on local filesystem 704) for computing intermediate functions. This use of local filesystem 704 may cause certain problems. For example, upgrades or patches in the local filesystem 704 or the distributed filesystem 702 may make them incompatible with each other. Particularly in situations where there a multiple local filesystems being used in a manner similar to local filesystem 704, this incompatibility problem may grow significantly.

Figure 8:
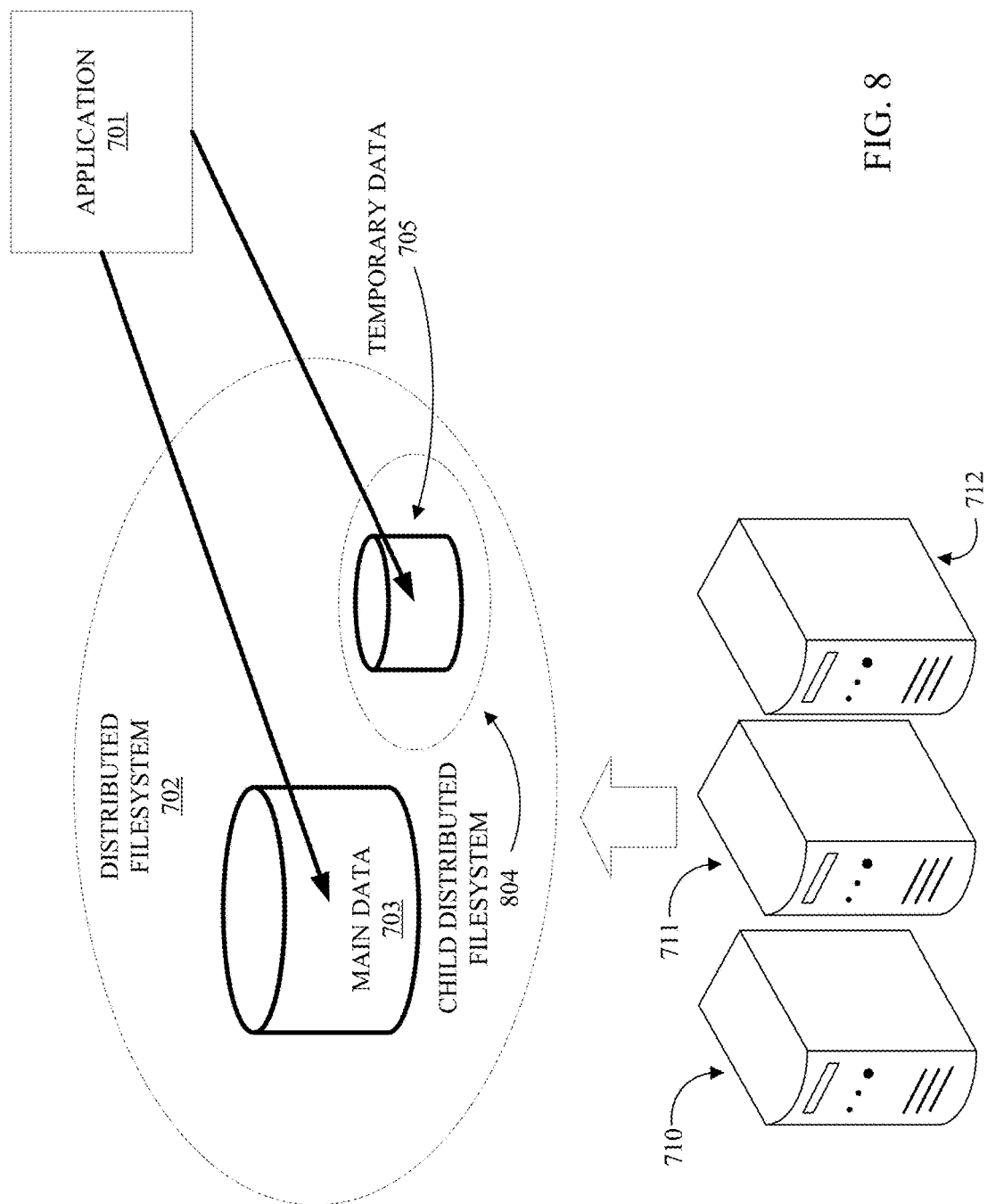
FIG. 8 illustrates a block diagram of the application of FIG. 7 using a child distributed filesystem for storing temporary data, in accordance with embodiments of the present disclosure.

Turning now to FIG. 8, shown is a block diagram of the application 701 of FIG. 7 using a child distributed filesystem 804 for storing temporary data 705, according to embodiments of the present disclosure. In this depicted embodiment, rather than using the local filesystem 704 for storing temporary data, the application 701 uses the child distributed filesystem 804. In some embodiments, child distributed filesystem 804 may be mounted on distributed filesystem 702, which may mean that distributed filesystem 702 is a parent filesystem. Further, child distributed filesystem 804 may be an isolated independent fileset. This may allow child distributed filesystem 804 to manage temporary data 705 with some independence from the remainder of distributed filesystem 702. For example, child distributed filesystem 804 may be configured to operate at a different redundant array of independent disks (RAID) level than the remainder of the distributed filesystem 702, including, for example, other child distributed filesystems also mounted to mount points of distributed filesystem 702.

Furthermore, in some embodiments, the storage of temporary data 705 in child distributed filesystem 804 rather than with the main data 703 may offer certain advantages. For example, if the child distributed filesystem 804 becomes corrupted then only the temporary data 705 may be affected (e.g., the main data 703 may remain unaffected and fully accessible).

Furthermore, in some embodiments, the use of isolated independent filesets, such as child distributed filesystem 804, may allow replication policies to be managed at the fileset level. For example, the replication mechanism for the distributed filesystem 702 could include a replication policy for files including main data 703, while child distributed filesystem 804 could include a different replication policy for files including temporary data 705. More specifically, in some embodiments, distributed filesystem 702 could maintain the main data 703 at a higher level of replication (e.g., two-way replication, three-way replication) in order to ensure the integrity of that data, while distributed filesystem 804 could maintain temporary data 704 such that it has no replication in order to ensure high performance.

Figure 9:
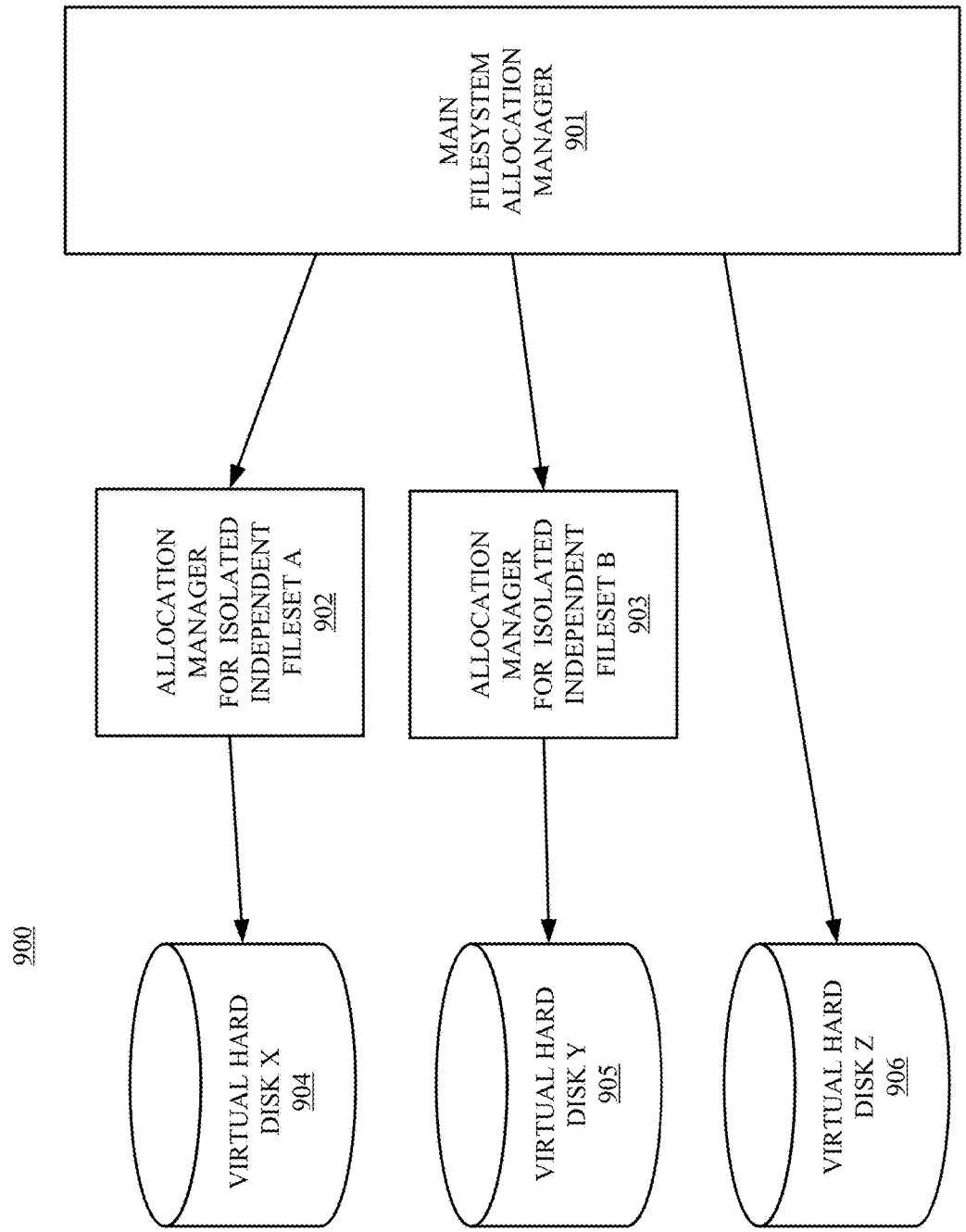
FIG. 9 illustrates a block diagram of an example filesystem performing federated allocation of virtual hard disk files to inodes and data blocks, in accordance with embodiments of the present disclosure.

Turning now to FIG. 9, shown is a block diagram of an example filesystem 900 performing federated allocation of virtual hard disk files to inodes and data blocks, according to embodiments of the present disclosure. As shown, filesystem 900 includes a main filesystem allocation manager 901 and allocation managers 902 and 903 for isolated independent filesets A and B, respectively. Each of the allocation managers 902 and 903 may be responsible for allocating specific files to specific blocks and specific inodes within the subpool of blocks and subpool of inodes of its respective isolated independent fileset. Allocation manager 901 may be responsible for allocating specific files to specific blocks and specific inodes within the main pool of blocks and the main pool of inodes. In addition, allocation manager 901 may be responsible for allocating subpools of inodes and subpools of data blocks (from the main pool of inodes and the main pool of data blocks) to isolated independent filesets (or, more specifically, to the allocation managers of the isolated independent filesets) as these filesets are created.

In the depicted embodiment, filesystem 900 may be attempting to store the files of three virtual hard disks X, Y, and Z (904-906). In this example, a determination has been made that virtual hard disk X 904 and virtual hard disk Y 905 each need to be isolated from the remainder of the filesystem 900, while virtual hard disk Z 906 is to be included in the main portion of the filesystem 900. To continue the example, the main filesystem allocation manager 901 creates isolated independent filesets A and B, which are each provided with an allocation manager (902 or 903), a subpool of data blocks, and a subpool of inodes.

Isolated independent fileset A is assigned, by the main filesystem allocation manager 901, to manage the files of virtual hard disk X 904. In response to the assignment, allocation manager 902 determines where the file data and file metadata of the files of virtual hard disk X 904 should be allocated within its subpool of data blocks and inodes. The allocation of the file metadata and file data of virtual hard disk X 904 is then completed by the allocation manager 902.

Similarly, isolated independent fileset B is assigned, by the main filesystem allocation manager 901, to manage the files of virtual hard disk Y 905. In response to the assignment, allocation manager 903 determines where file data and file metadata of the files of virtual hard disk Y 905 should be allocated within its subpools of data blocks and inodes. The allocation of the file metadata and file data of virtual hard disk X 905 is then completed by the allocation manager 903.

Because the files of virtual hard disk Z 906 are to be maintained in the main inode and data block pools, they are managed directly by the main filesystem allocation manager 901. Thus, to complete the allocation, main filesystem allocation manager 901 allocates the file metadata and file data of virtual hard disk Z 906 to specific blocks and specific inodes within the main pools of blocks and inodes.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
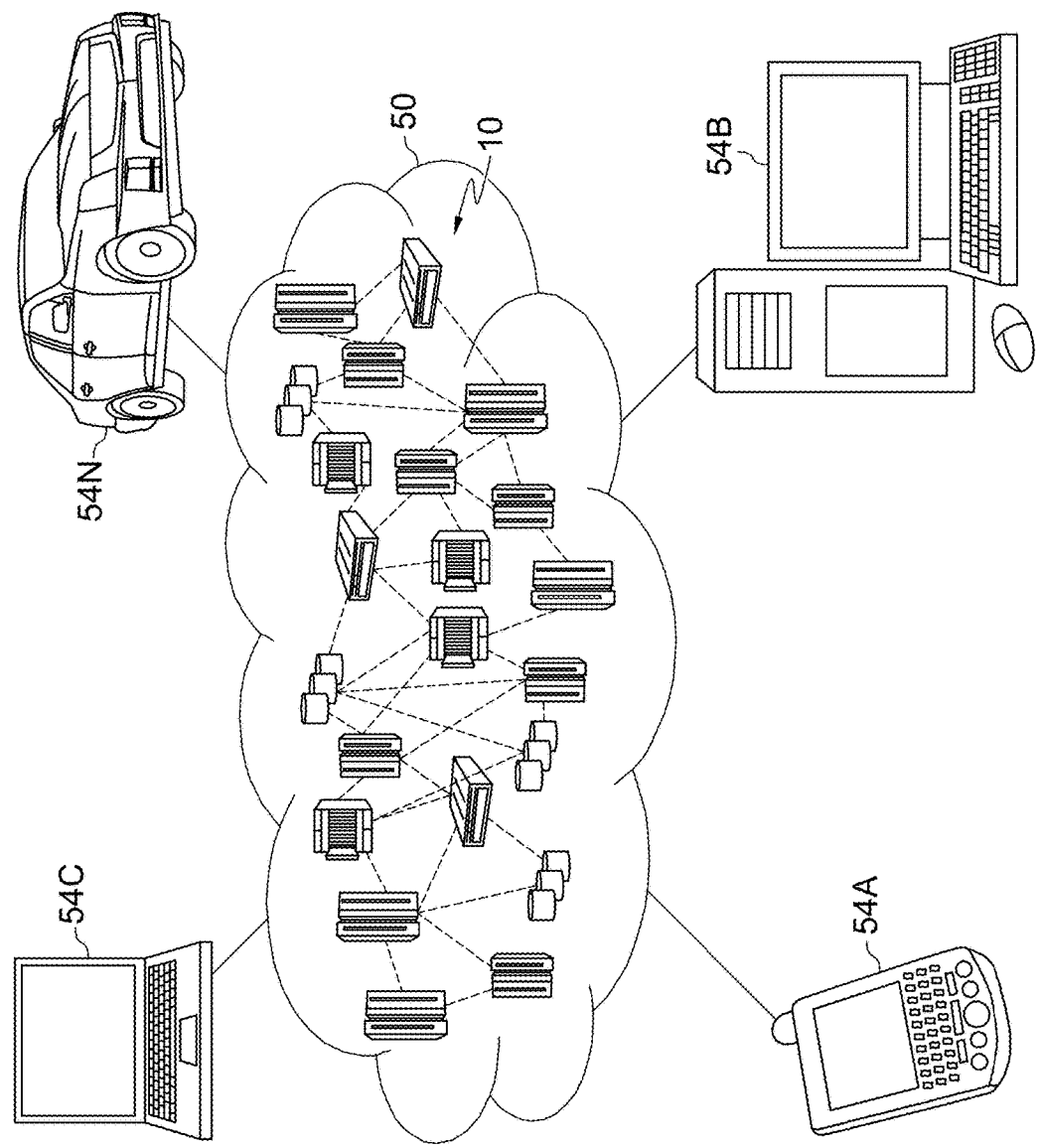
FIG. 11 illustrates a diagram of a cloud computing environment, in accordance with embodiments of the present disclosure.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
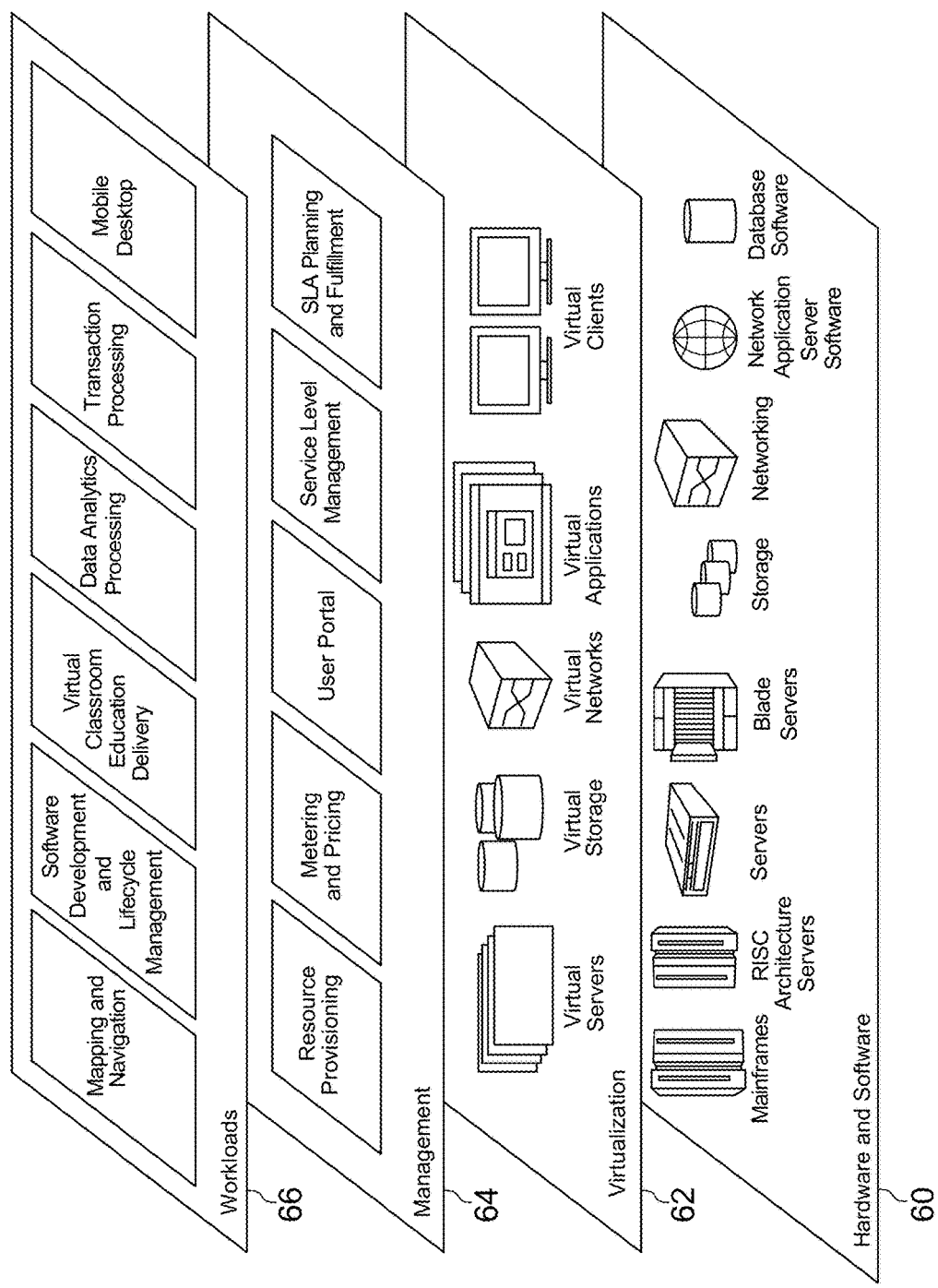
FIG. 12 illustrates a diagram of abstraction model layers, in accordance with embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In some embodiments, one or more layers, including virtualization layer 62, may provide for the management of isolated independent filesets as described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a filesystem, the filesystem including a pool of data blocks and further including a pool of index blocks, the method comprising:
    identifying within the pool of data blocks a plurality of non-overlapping subpools of data blocks, the plurality of subpools of data blocks including a first subpool of data blocks and further including a second subpool of data blocks;
    identifying within the pool of index blocks a plurality of non-overlapping subpools of index blocks, the plurality of subpools of index blocks including a first subpool of index blocks and further including a second subpool of index blocks, wherein the first subpool of data blocks is non-overlapping with the second subpool of data blocks, and wherein the first subpool of index blocks is non-overlapping with the second subpool of index blocks, and wherein each of the first and second subpools of data blocks and the first and the second subpools of index blocks are arranged in isolated, independent file sets;
    mounting a first file group within a global namespace on a first mount point on the filesystem;
    mounting a second file group within the global namespace on a second mount point on the filesystem, wherein the first mounted file group and the second mounted file group are configured to undergo filesystem checks independently of each other, the filesystem checks performed in response to corruption within at least one of the first mounted file group and the second mounted file group;
    allocating the first subpool of data blocks to the first mounted file group, wherein the allocating the first subpool of data blocks to the first mounted file group comprises transferring control of the first subpool of data blocks from the filesystem to the first file group;
    allocating the first subpool of index blocks to the first mounted file group, wherein the allocating the first subpool of index blocks to the first mounted file group comprises transferring control of the first subpool of index blocks from the filesystem to the first file group;
    allocating the second subpool of data blocks to the second mounted file group;
    allocating the second subpool of index blocks to the second mounted file group;
    operating the first mounted file group at a first redundant array of independent disks (RAID) level while operating the second mounted file group at a second RAID level; and
    performing, in response to corruption resulting from double allocation of at least one data block within the first mounted file group, a filesystem check on the first mounted file group without contemporaneously performing the filesystem check on the second mounted file group.

2. The method of claim 1, wherein the filesystem is a parent distributed filesystem, wherein the first mounted file group is a first child distributed filesystem nested on the parent distributed filesystem, and wherein the second mounted file group is a second child distributed filesystem nested on the parent distributed filesystem.

3. The method of claim 1, wherein the first mounted file group is a first virtual hard drive corresponding to a first virtual machine, and wherein the second mounted file group is a second virtual hard drive corresponding to a second virtual machine.

4. The method of claim 1 further comprising: establishing a corruption isolation barrier between a first virtual machine having a first virtual hard drive and a second virtual machine having a second virtual hard drive by storing data of the first virtual hard drive within the first subpool data blocks allocated to the first mounted file group, further by storing metadata of the first virtual hard drive within the first subpool of index blocks allocated to the first mounted file group, further by storing data of the second virtual hard drive within the second subpool of data blocks allocated to the second mounted file group, and further by storing metadata of the second virtual hard drive with the second subpool of index blocks allocated to the second mounted file group.

5. The method of claim 1, wherein the first subpool of data blocks includes a first set of data blocks physically located on a first server and further includes a second set of data blocks physically located on a second server, and wherein the second subpool of data blocks includes a third set of data blocks physically located on the first server and further includes a fourth set of data blocks physically located on the second server.

6. The method of claim 5, wherein the first subpool of index blocks includes a first set of index blocks physically located on the first server and further includes a second set of index blocks physically located on the second server, and wherein the second subpool of index blocks includes a third set of index blocks physically located on the first server and further includes a fourth set of index blocks physically located on the second server.

7. A computer program product for managing a filesystem, the filesystem including a pool of data blocks, and further including a pool of index blocks, the computer program product comprising a non-transitory computer-readable storage medium having program instructions embodied therewith, the program instructions executable by a computer to cause the computer to:

identify within the pool of data blocks a plurality of non-overlapping subpools of data blocks, the plurality of subpools of data blocks including a first subpool of data blocks and further including a second subpool of data blocks;

identify within the pool of index blocks a plurality of non-overlapping subpools of index blocks, the plurality of subpools of index blocks including a first subpool of index blocks and further including a second subpool of index blocks, wherein the first subpool of data blocks is non-overlapping from the second subpool of data blocks, and wherein the first subpool of index blocks is non-overlapping from the second subpool of index blocks, and wherein each of the first and second subpools of data blocks and the first and the second subpools of index blocks are arranged in isolated, independent file sets;

mount a first file group within a global namespace on a first mount point on the filesystem; mount a second file group within the global namespace on a second mount point on the filesystem, wherein the first mounted file group and the second mounted file group are configured to undergo filesystem checks independently of each other, the filesystem checks performed in response to corruption within at least one of the first mounted file group and the second mounted file group;

allocate the first subpool of data blocks to the first mounted file group, wherein the allocating the first subpool of data blocks to the first mounted file group comprises transferring control of the first subpool of data blocks from the filesystem to the first file group;

allocate the first subpool of index blocks to the first mounted file group, wherein the allocating the first subpool of index blocks to the first mounted file group comprises transferring control of the first subpool of index blocks from the filesystem to the first file group, wherein the first mounted file group includes a first set of files, the first set of files having a first set of file data and further having a first set of file metadata;

populate the first subpool of data blocks with the first set of file data;

populate the first subpool of index blocks with the first set of file metadata;

allocate the second subpool of data blocks to the second mounted file group;

allocate the second subpool of index blocks to the second mounted file group, wherein the second mounted file group includes a second set of files, the second set of files having a second set of file data and further having a second set of file metadata;

populate the second subpool of data blocks with the second set of file data;

populate the second subpool of index blocks with the second set of file metadata;

operate the first mounted file group at a first redundant array of independent disks (RAID) level while operating the second mounted file group at a second RAID level; and perform, in response to corruption resulting from double allocation of at least one data block within the first mounted file group, a filesystem check on the first mounted file group without contemporaneously performing the filesystem check on the second mounted file group.

8. The computer program product of claim 7, wherein the filesystem is a parent distributed filesystem, wherein the first mounted file group is a first child distributed filesystem nested on the parent distributed filesystem, and wherein the second mounted file group is a second child distributed filesystem nested on the parent distributed filesystem.

9. The computer program product of claim 7, wherein the first subpool of data blocks includes a first set of data blocks physically located on a first server and further includes a second set of data blocks physically located on a second server, and wherein the second subpool of data blocks includes a third set of data blocks physically located on the first server and further includes a fourth set of data blocks physically located on the second server.

10. The computer program product of claim 9, wherein the first subpool of index blocks includes a first set of index blocks physically located on the first server and further includes a second set of index blocks physically located on the second server, and wherein the second subpool of index blocks includes a third set of index blocks physically located on the first server and further includes a fourth set of index blocks physically located on the second server.

11. A system for managing a filesystem, the filesystem including a pool of data blocks and further including a pool of index blocks, the system comprising one or more computer processor circuits configured to perform a method comprising:

identifying within the pool of data blocks a plurality of non-overlapping subpools of data blocks, the plurality of subpools of data blocks including a first subpool of data blocks and further including a second subpool of data blocks;

identifying within the pool of index blocks a plurality of non-overlapping subpools of index blocks, the plurality of subpools of index blocks including a first subpool of index blocks and further including a second subpool of index blocks, wherein the first subpool of data blocks is non-overlapping from the second subpool of data blocks, and wherein the first subpool of index blocks is non-overlapping from the second subpool of index blocks, and wherein each of the first and second subpools of data blocks and the first and the second subpools of index blocks are arranged in isolated, independent file sets;

mounting a first file group within a global namespace on a first mount point on the filesystem;

mounting a second file group within the global namespace on a second mount point on the filesystem, wherein the first mounted file group and the second mounted file group are configured to undergo filesystem checks independently of each other, the filesystem checks performed in response to corruption within at least one of the first mounted file group and the second mounted file group;

allocating the first subpool of data blocks to the first mounted file group;

allocating the first subpool of index blocks to the first mounted file group;

allocating the second subpool of data blocks to the second mounted file group;

allocating the second subpool of index blocks to the second mounted file group;

establishing a corruption isolation barrier between a first virtual machine having a first virtual hard drive and a second virtual machine having a second virtual hard drive by storing data of the first virtual hard drive within the first subpool data blocks allocated to the first mounted file group, further by storing metadata of the first virtual hard drive within the first subpool of index blocks allocated to the first mounted file group, further by storing data of the second virtual hard drive within the second subpool of data blocks allocated to the second mounted file group, and further by storing metadata of the second virtual hard drive with the second subpool of index blocks allocated to the second mounted file group;

operating the first mounted file group at a first redundant array of independent disks (RAID) level while operating the second mounted file group at a second RAID level; and performing, in response to corruption resulting from double allocation of at least one data block within the first mounted file group, a filesystem check on the first mounted file group without contemporaneously performing the filesystem check on the second mounted file group.

12. The system of claim 11, wherein the filesystem is a parent distributed filesystem, wherein the first mounted file group is a first child distributed filesystem nested on the parent distributed filesystem, and wherein the second mounted file group is a second child distributed filesystem nested on the parent distributed filesystem.

13. The system of claim 11, wherein the first subpool of data blocks includes a first set of data blocks physically located on a first server and further includes a second set of data blocks physically located on a second server, and wherein the second subpool of data blocks includes a third set of data blocks physically located on the first server and further includes a fourth set of data blocks physically located on the second server.

14. The system of claim 13, wherein the first subpool of index blocks includes a first set of index blocks physically located on the first server and further includes a second set of index blocks physically located on the second server, and wherein the second subpool of index blocks includes a third set of index blocks physically located on the first server and further includes a fourth set of index blocks physically located on the second server.

15. The method of claim 1, wherein the corruption resulting from double allocation of at least one data block is the result of a hardware bug marking a data block that is currently used by a first fileset as free, followed by a second fileset attempting to store data within the data block.

16. The method of claim 15, wherein the first and second filesets are child filesets mounted on nested mount points of the filesystem.

17. The method of claim 1, wherein the corruption resulting from double allocation of at least one data block is the result of a software bug marking a data block that is currently used by a first fileset as free, followed by a second fileset attempting to store data within the data block.

18. The method of claim 1, wherein the corruption resulting from double allocation of at least one data block include multiple misallocations of data blocks within a fileset.

19. The method of claim 18, wherein the fileset including double allocation of at least one data block is part of a virtual hard disk used for a virtual machine.

* * * * *